(12) United States Patent
Martinez Perea et al.

(10) Patent No.: US 9,866,434 B2
(45) Date of Patent: Jan. 9, 2018

(54) METHOD, SYSTEM AND DEVICES FOR MANAGING USER REGISTRATION OF A SERVICE IN AN IMS NETWORK

(71) Applicant: Vodafone IP Licensing Limited, Newbury, Berkshire (GB)

(72) Inventors: Rogelio Martinez Perea, Madrid (ES); Enrique Collado, Madrid (ES); Rafael Dominguez, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 38 days.

(21) Appl. No.: 14/083,154

(22) Filed: Nov. 18, 2013

(65) Prior Publication Data
US 2014/0143393 A1 May 22, 2014

(30) Foreign Application Priority Data
Nov. 16, 2012 (EP) .................................... 12382453

(51) Int. Cl.
*H04L 12/24* (2006.01)
*H04L 29/06* (2006.01)

(52) U.S. Cl.
CPC ...... *H04L 41/0816* (2013.01); *H04L 65/1016* (2013.01); *H04L 65/1073* (2013.01); *H04L 65/80* (2013.01)

(58) Field of Classification Search
CPC ............ H04L 65/1016; H04L 65/1069; H04L 65/1006; H04L 65/1073; H04L 65/1063; H04L 65/40
See application file for complete search history.

(56) References Cited

U.S. PATENT DOCUMENTS

| | | | | |
|---|---|---|---|---|
| 8,611,890 | B2 * | 12/2013 | Ionescu | ........................ 455/425 |
| 2003/0076808 | A1 * | 4/2003 | McNiff | ................... H04W 8/02 370/345 |
| 2004/0234060 | A1 * | 11/2004 | Tammi et al. | ........... 379/204.01 |
| 2009/0190501 | A1 * | 7/2009 | Long | ............................ 370/254 |
| 2010/0093284 | A1 * | 4/2010 | Diaz-Chiron | Terrero ......... H04W 24/10 455/67.11 |
| 2010/0246381 | A1 * | 9/2010 | Sendra Alcina | .... H04L 65/1073 370/216 |

(Continued)

FOREIGN PATENT DOCUMENTS

| WO | 2004089023 | 10/2004 | | |
|---|---|---|---|---|
| WO | WO 2004088950 A1 * | 10/2004 | ............. | H04L 29/06 |
| WO | WO 2007006234 A1 * | 1/2007 | ........... | H04L 12/581 |

(Continued)

OTHER PUBLICATIONS

Henry,K, et al., "Rich Communication Suite", 13th International Conference on Intelligence in Next Generation Networks, Oct. 26-29, 2009, pp. 1-6.*

(Continued)

*Primary Examiner* — Kevin Bates
*Assistant Examiner* — Lesa Kennedy
(74) *Attorney, Agent, or Firm* — Workman Nydegger

(57) ABSTRACT

Present invention refers to a method system and devices for managing user registration of a service in a IMS network. The proposed solution allows optimizing the dimensioning of networks focusing on active users.

15 Claims, 1 Drawing Sheet

(56) References Cited

U.S. PATENT DOCUMENTS

2012/0214480 A1* 8/2012 Ionescu ................ H04W 4/001
                        455/425

FOREIGN PATENT DOCUMENTS

| WO | 2009067061 | 5/2009 |
| WO | 2010150043 | 12/2010 |

OTHER PUBLICATIONS

3GPP TS 23.228, Version 10.6.0, Release 10 (Oct. 2011).*
Search Report issued in European Application No. 12382453 dated Mar. 15, 2013.

* cited by examiner

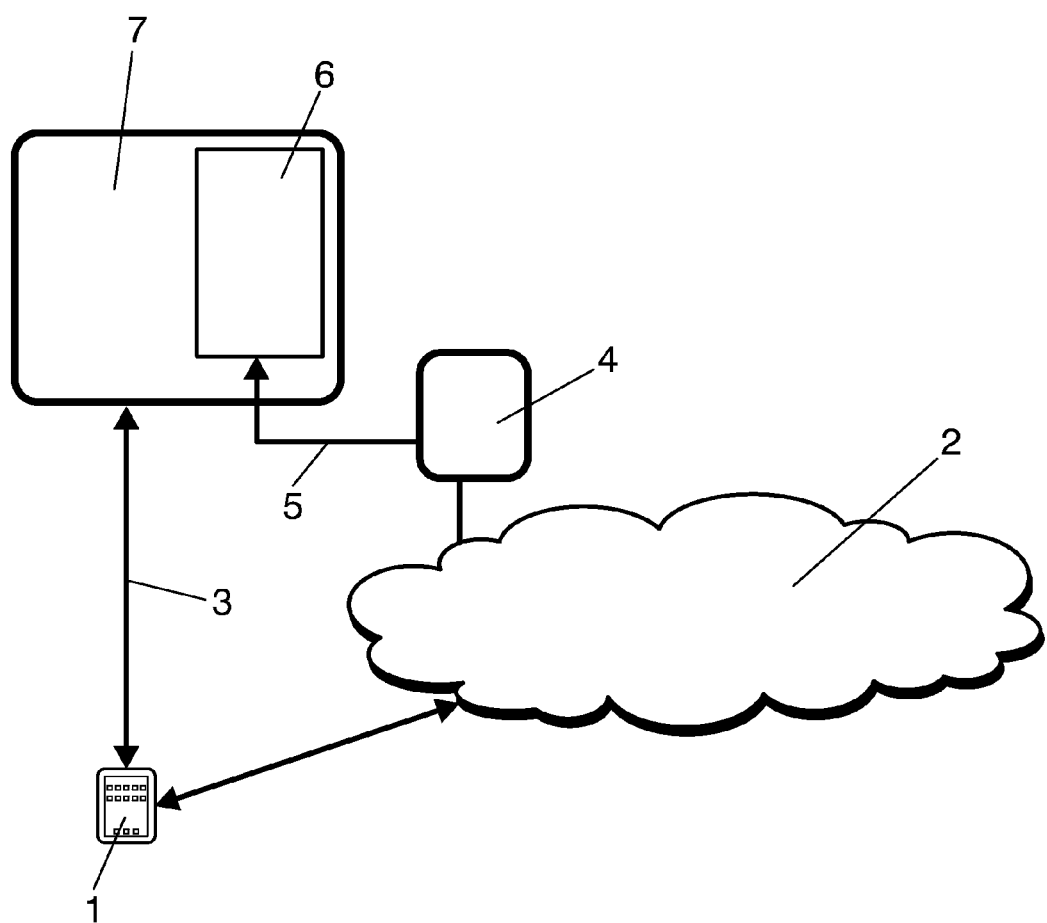

METHOD, SYSTEM AND DEVICES FOR MANAGING USER REGISTRATION OF A SERVICE IN AN IMS NETWORK

CROSS REFERENCE TO RELATED APPLICATIONS

This application claims priority to European Application Number 12382453.4, filed on Nov. 16, 2012, the entirety of which is incorporated herein by reference.

TECHNICAL HELD OF THE INVENTION

The present invention relates generally to IMS (IP Multimedia Subsystem) networks and more specifically to the registration of a user of services, as RCS (Rich Communication Suite) services, in order to optimize the dimensioning of networks focusing on active users.

BACKGROUND OF THE INVENTION

Nowadays IMS networks are firmly penetrating in the market due to the increasing demand of mobile and fixed multimedia services. IMS networks are implemented on a 3GPP standardized implementation of Session Initiation Protocol (SIP), and runs over standard Internet Protocol (IP) networks, but existing phone systems (both packet-switched and circuit-switched) are supported. IMS networks truly merge the Internet with the world of mobile telephony; it uses mobile technologies to provide ubiquitous access and Internet technologies to provide appealing services.

Leading the services deployed over IMS network is Rich Communication Suite (RCS) which is a service upgrade that marks the transition of messaging and voice capabilities from Circuit Switched technology to an all-IP world. RCS provides a framework for discoverable and interoperable advanced communication services and detailed specifications for a basic set of advanced communication services. Detailed information about the specification can be found at GSMA webpage as a public document.

Main features of RCS are:
  Enhanced Phonebook with service capabilities.
  Enhanced Messaging, since RCS enables a large variety of messaging options including chat and messaging history and file transfer.
  Enriched Call. Users may share contents during a voice call instead of the traditional "see what I see" capability.

For RCS, the one mandatory network element is the IMS core system which enables peer-to-peer communication between RCS clients. Other network nodes can be deployed by the Service Provider to provide additional parts of the RCS feature set. For example the ACS node (or AutoConfiguration Server node), which is responsible for both the client configuration and the network provisioning. The client configuration may be based, for example, on an http or https session or both. Said https session includes the configuration xml, with all the relevant information about the IMS connection for registering (such as IPs or urls, connection parameters and protocols, authorization user, password, etc) and service configuration parameters.

Early stage RCS deployments are characterized by a very small "Active/Registered" (A/R) users ratio and, until sufficient penetration of RCS service is achieved, the A/R ratio is likely to be maintained at very low levels. It is estimated that significantly increasing the A/R ratio may still take several years.

On the other hand, in order to increase the RCS penetration, networks need to be dimensioned according to the expected number of registered users, but the small ratio of active/registered users means that the networks are underused. Optimizing properly the dimensioning of the networks is a main issue for telco companies and users which are registered but their profile is non-active means a problem. Every user registered in a IMS network costs a license to be paid by telco companies and high number of non-active users registered in a network costs a lot of money that has to be paid to a third party (the owner of the network) when actually, the users are not using the network at all. Moreover the existence of a big amount of registered non-active users implies an unnecessary signaling overload in the IMS network.

SUMMARY OF THE INVENTION

Present invention serves to solve the aforesaid problem by providing a method for managing registration of a user of at least one service in an IP Multimedia Subsystem, IMS, network, the user accessing the IMS network using a client, the method comprising the following steps:
  a) a first server acquiring service traffic information of said user from the IMS network for said at least one service;
  b) said server sending the service traffic information to a managing node;
  c) checking in the managing node if said at least one service traffic inthrmation of the user meets a set of criteria predefined in the managing node;
  d) if the service traffic information of the user does not meet the set of criteria, sending a request from the managing node to a configuration server for assigning a first state to said user and the configuration server sending a configuration message indicating said first state to said client;
  e) the client receiving the configuration message and;
  f) configuring the client to prevent sending requests thr registration of said user to the IMS network while the user is assigned said first state.

In an embodiment, said requests for registration may be SIP REGISTER messages.

In an embodiment, the configuration message further includes relevant information to allow the access of the user to the IMS network and information about the state is included in a certain field of the configuration message. Said configuration message may be xml configuration message.

In an embodiment, the at least one service is a RCS, Rich Communication Suite, service and where the configuration server is an RCS auto configuration server, the user is a RCS user and the client is an RCS client.

In an embodiment, when a first user sends a message to a second user which is not registered in the IMS network, said message is stored until the second user is registered in the IMS network and the stored message is sent to the second user once the second user is registered.

In an embodiment, step d) further includes that: if the traffic information of the user meets the set of criteria, sending a request from the managing module to the access control server for assigning a second state to the user and the configuration server sending a configuration message indicating said second state to said client;

Step d) may further include that if there is a message for said user, the configuration server assigns a second state to the user and sends the configuration message indicating said state to the client In an embodiment, step d) further includes that: if the client requests an action to the configuration server, said action requiring that the user is registered in the IMS network, the configuration server assigns a second state to the user and sends the configuration message indicating said second state to the client.

The managing node may be part of the configuration server or it may be an independent network node which communicates with the configuration server.

In another aspect, a network node is provided which comprises means for receiving service traffic information of at least one service in a IMS network; for checking if said service traffic information of the user meets a set of predefined criteria and for, if the traffic information of the user does not meet the set of criteria, sending a request to a configuration server for assigning a first state to said user.

In another aspect, a network node is provided which comprises means for acquiring service traffic information of a user for at least one service from an IMS network; means for sending said at least one service traffic information to another network node.

In another aspect, a client in a user equipment is provided, comprising means for receiving from a configuration server a configuration message including an indication of a state assigned to the user; and for preventing sending requests for registration to the IMS network while said assigned state is set to a first state.

In another aspect, a system for managing registration of a user of at least one service in an IMS network, the user accessing the IMS network using a client, is provided. The system comprising:
  a first server having means for acquiring service traffic information of said user for at least said one service from the IMS network and for sending the user traffic information to a managing node;
  a managing node having means to receive said user traffic information, to check if said service traffic information of the user meets a set of criteria predefined in the managing node and to, if the service traffic information of the user do not meet the set of criteria, sending a request from the managing node to a configuration server for assigning a first state to said user;
  a configuration server having means to receive a request from the managing node for assigning a first state to said user and means for sending a configuration message including said state to said client;
  the client having means for receiving the configuration message from the configuration server and for preventing sending requests for registration from the client to the IMS network while said assigned state is set to the first state.

Finally, a computer program comprising computer program code means adapted to perform the above-described method is presented.

In particular, the invention may be found in a method for managing registration of a user of at least one service in an IP Multimedia Subsystem, IMS, network, the user accessing the IMS network using a client, characterized by comprising the steps of: a) receiving service traffic information of said user on the IMS network for said at least one service by a managing node; b) checking in the managing node if said service traffic information of the user meets a set of predefined criteria; and c) if the service traffic information of the user does not meet the set of criteria, sending a request from the managing node to a configuration server for assigning an inactivity state to said user and the configuration server sending a configuration message indicating said inactivity state to said client.

Optionally, the method further comprises: d) the client receiving the configuration message and; e) configuring the client to prevent sending requests for registration to the IMS network while the user is assigned said inactivity state. Optionally, the configuration message further includes relevant information to allow the access of the user to the IMS network and the information about the state of the user is included in a certain field of the configuration message. Optionally, the at least one service is a RCS, Rich Communication Suite, service and where the configuration server is an RCS auto configuration server, the user is a RCS user and the client is an RCS client.

Optionally, the method further comprises: when a first user sends a message to a second user which is not registered in the IMS network, said message is stored until the second user is registered in the IMS network. Optionally, the request for registration sent by the client to the IMS network is a SIP REGISTER message.

Optionally, step c) further includes that: if the traffic information of the user meets the set of criteria, sending a request from the managing module to the access control server for assigning a second state to the user and the configuration server sending a configuration message indicating said second state to said client. Optionally, step c) further includes that: if there is a message for said user, the configuration server assigns a second state to the user and sends the configuration message indicating said second state to the client. Optionally, step c) further includes that: if the client requests an action to the configuration server, said action requiring that the user is registered in the IMS network, the configuration server assigns a second state to the user and sends the configuration message indicating said second state to the client.

Optionally, the managing node is part of the configuration server. Optionally, the configuration message is an xml configuration message.

In another aspect, there may be found a network node comprising: an input, configured to receive service traffic information of an user in a IMS network for at least one service, the service traffic information being indicative of user activity; checking logic, configured to check if said at least one service traffic information of the user meets a set of predefined criteria; and a configuration output, arranged to send a request to a configuration server for assigning a first state to said user, if the service traffic information of the user does not meet the set of criteria and thereby cause the user to prevent sending requests for registration to the IMS network.

In a further aspect, there may be found a method for operating a client in a user equipment of a user comprising the steps of: a) receiving from a configuration server a configuration message including an indication of an inactivity state assigned to the user; and b) preventing sending requests for registration to an IP Multimedia Subsystem, IMS network while said assigned state is set to an inactivity state.

In a yet further aspect, there may be found a system for managing registration of a user of at least one service in an IMS network, the user accessing the IMS network using a client at a user equipment, the system is characterized by comprising: a managing node configured to receive service traffic information at the user from the IMS network, to check if said service traffic information of the user meets a set of criteria predefined in the managing node and, if the service traffic information of the user do not meet the set of criteria, send a request from the managing node to a configuration server for assigning an inactivity state to said user; a configuration server configured to receive a request from the managing node for assigning an inactivity state to said user and send a configuration message including said state to said client; and the client configured to receive the configuration message from the configuration server and prevent sending requests for registration from the client to the IMS network while said assigned state is set to the inactivity state.

There may also be provided a computer program product comprising computer program code adapted to perform the method as described herein when said program code is executed on a computer, a digital signal processor, a field-programmable gate array, an application-specific integrated circuit, a micro-processor, a micro-controller, or any other form of programmable hardware.

The above features and advantages do not limit the present invention, and those skilled in the art will recognize additional features and advantages upon reading the following detailed description and upon viewing the accompanying drawings.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented:

FIG. 1 shows a block diagram of a registration management system according to one embodiment of the present invention.

DETAILED DESCRIPTION OF THE INVENTION

This invention describes a process for managing the registration of users of a service in an IMS network. Monitoring the traffic of each user determines, according to a certain criteria, if the user is active or non-active. Non-active users are unregistered from the network solving the network oversizing problem.

This smart capacity management may achieve two goals: reducing the number of registered users and/or the number of provisioned users; and to provide a transparent situation for the user who is not registered and/or provisioned, to provide service continuity for all users. The network usage may be dynamically adjusted based on the real usage, thus creating a more efficient network.

A user accesses the IMS network using a client entity (from now on, a client) which performs the necessary actions to allow the user to access the IMS network. Said client entity may be the user equipment itself or a specific client application installed in the user equipment (for example, an RCS client application).

The management of the registration of the users is illustrated by FIG. 1, where can be seen a particular embodiment of the invention. A user 1 of a rich communication service (an RCS user) is registered in an IMS network 2 to enable peer-to-peer communication with other clients of RCS. The client of the user requests 3 to the AutoConfiguration Server 7 (ACS) for its configuration sending an http(s) session is initiated. The http(s) session includes information sent from the client to the ACS, such as current version, terminal model, client vendor, etc. The response from the server in that very same https session includes configuration information, for example over an xml message, with all the relevant information about the IMS connection (such as IPs or urls, connection parameters and protocols, authorization user, password, etc). And then the user is registered (for example, through a RCS client application installed in the user equipment) by the user's client, sending for example, a SIP REGISTER message to the IMS network.

The client sends periodic registration requests to the IMS network to refresh the registration of the user because a SIP REGISTER message has an expiration time. This is done even when the user has not been involved in any communication event.

An RCS-application server 4 (RCS-AS) is added in this embodiment of the invention. This node is responsible for collecting information in real-time. In an embodiment, said node collects information about every RCS event. The events collected contain information such as origin, destination (s), time, day, duration, response code, etc. All the events are recorded generating traffic information of each user of RCS in the network, being this traffic information originated for example by 1 on 1 chat, 1 to many chat, file transfer, video-share, image-share, VoIP . . . .

Optionally, an Originating Policy Control Application Server (O-PCAS) (not shown) may be responsible for creating the originating activity records for every RCS-e transaction excluding group-chat. To avoid network complexity, this functionality may be triggered with the same headers as Application Interface Charging Server (AICS) and Videoshare CDRs, with the same network trigger. O-PCAS may also dynamically detect the activity aimed towards a de-provisioned user.

Also an optional Terminating Policy Control Application Server (T-PCAS) (not shown) may be responsible for creating activity records for RCS-e actions originating in interconnected networks. To avoid network complexity, this functionality shall be triggered with the same headers as Videoshare CDRs, with the same network trigger. T-PCAS may also dynamically detect the activity aimed towards a de-provisioned user.

Once the traffic information have been collected in the application server, it is sent 5 to a managing node 6, included in this embodiment of the invention as "RCS Activity Manager" or "RAM". This node is responsible for maintaining an individualized record of activity for every RCS user. It is defined a certain criteria (for example, establishing a threshold) for the data collected. This process can include: the last day of activity, the total amount of events for a certain period of time (day/week/month . . . ), a statistical model for the past usage, etc. Based on these records, and according to the criteria set, the node marks as active/non-active the users based on the criteria match, (in other words, if the traffic information collected for a user meet the criteria set, the RAM marks the user as active, i.e it assigns an "active" state to the user, and if the traffic information collected for a user does not meet the criteria set, the RAM marks the user as non-active, i.e it assigns a "non-active" state to the user). For example, setting a threshold=7 for a number of days without activity means that a user without any activity in the last 7 days will be considered as a "non-active" user. Another example is setting a criterion for the number of events per month, and consider as "non-active" to a user who does not make at least 5 events per month. Any combination of these criteria may be used in a statistical process to set a more complete threshold finely tuned according to the whole traffic information.

Said RAM node can be part of the ACS node or can be a node independent of the ACS node which communicates with the ACS node.

The RAM node communicates with the AutoConfiguration Server 7, ACS, responsible for the client configuration as discussed previously, and the ACS sends said activity information of the user to the client. In an embodiment, the communication between the RAM and the ACS is dynamic and asynchronous. It can be made using any known protocol (for example an API REST or an API SOAP) in an embodiment, when there is a change of state for a user, the RAM communicates said change of state to the ACS, including the user identification.

The RAM 6 may therefore maintain the activity records for every enabled user. This activity may be used to decide whether a user should be marked as active or de-provisioned. One of the key factors to decide this activity field may be the RCSe client version and vendor, and its compatibility with the proposed functionality. Typically, only Registered Users Smart Capacity Management (RUSCM) compatible clients will be designated as de-provisioned. The RAM module 6 may receive information from O-PCAS and T-PCAS and information of group chat from the IM may be additionally provided. The RAM 6 may further detect the activity aimed towards a de-provisioned user. In this case, the RAM 6 or ACS 7 may be responsible for sending an autoconfiguration SMS to the user to retrieve a new status and xml for the server.

In an embodiment, a new parameter (called activity parameter) may be introduced to indicate the state "active" or "non-active" of the user (if the parameter has a certain first value it would mean that the user is not active and if the parameter has a certain second value it would mean that the user is active) and said parameter is sent to the client.

In another embodiment, to indicate the state to the user, a new value is introduced in one of the existing fields of the configuration message (for example, the field "version" and the value "−2" to identify the client as "non-active"). Reading said field, the client can know its state. This information about the state of the user will be included in the configuration information sent to the client in the autoconfiguration process.

The client is configured to prevent registering the user into the IMS network if the state received from the ACS is set to "non active"

When the client receives the xml configuration message, the RCS client is configured for obtaining the state of the user from said configuration message. If the state is "non-active" the client, in consequence, stops sending the periodic requests for registration to the IMS network. SIP REGISTER message is not sent again until the client receives another configuration message, indicating an active state of the user. In another embodiment, when the client receives a configuration message indicating a "non-active" state, the client can send immediately a SIP REGISTER with the value expires=0, so it is deregistered from the network.

In an embodiment when there is a change in the state of a user (from non-active to active or vice versa), the ACS may trigger a communication to the client, as an SMS or a push message, forcing the client to request immediately the configuration from the ACS. Then the ACS will send a configuration message to the client indicating the new state.

For example, when there is an incoming communication to a user who is not registered, the ACS may trigger a communication to the client, as an SMS or a push message, forcing the client to request immediately the configuration from the ACS. Previously, the ACS changes the value associated with said user from "non-active" to "active" user and includes it in the configuration message, in order to let the client proceed with the registration as soon as the configuration xml is obtained.

Or for example, when a non registered user wants to establish a communication with another user of the service, the client notifies the ACS that it wants to establish a communication, the ACS changes the state of the user from "non-active" to "active" and it informs the client (as the same way indicated in the previous paragraph).

One embodiment of the invention includes a modification in the information that the client sends to the ACS during the http(s) session. Normally, this information contains data such as current version, terminal model, client vendor, etc. but, in order to include information about the autoconfiguration process, it is added a parameter which indicates if the autoconfiguration request comes from an action that requires the user to be active (like manually open the application, sending a message or file transfer, initiate a call, etc. ... ). When the ACS receives the http(s) request from the client, and this parameter is activated, the ACS changes the state of the user to "active", it indicates said state to the client and it proceeds with the register sending a SIP REGISTER message to the IMS network.

The transition from active to deprovisioned status will now be discussed on a practical level. The transition from active to de-provisioned may be marked by the Autoconfiguration server. When an autoconfiguration request is made, the ACS may check in RAM if the de-provisioned condition is to be applied in this case. For this to happen, the RAM may implement a time-based decision, and the following conditions may be met: the user has been provisioned for more than X days, with X a configurable value; the user does not have any activity record in this X days, including both originating and terminating (the services monitored may be: 1 to 1 chat, file transfer, image-share and video-share. In a phase 1.2, CDRs from the IM-AS concerning Group-chat could be added in the RAM database); the user is requesting the autoconfiguration with a (Registered-. Provisioned) Users Smart Capacity Management ((R-P)USCM) enabled client; the client has been in inactive status (xml version=−2) for Y days, with Y a configurable value (this means that the user, despite not being registered, did not receive any terminating activity in that time).

Unlike the RUSCM, which may require no further action from ACS, in this case, it may be mandatory to deprovision the user. In case of deprovision, the affected systems may be: IM-AS, HSS and ENUM. No systems integration or conciliation may be required in this phase. For this purpose, Provisioning Interface (PINT) may be used.

The transition from deprovisioned to active status will now be discussed on a practical level. The transition from de-provisioned to active may be determined either by the autoconfiguration server or the client itself, being almost the same than the case of RUSCM transition from inactive to active. At the client, it may be able to detect when a request is made by direct interaction of the user or a periodic or automatic request may be used. When the client detects a user interaction (the user manually opens the client, for instance), it may request a new autoconfiguration xml with a version=−3. This way, the ACS may detect that the client is willing to register in order to start an interaction with another RCSe user. In this case, the ACS may follow the normal autoconfiguration process, including the provision through PINT in HSS and ENUM (the provision in IM-AS will happen automatically when the user registers) and answering with an xml with version !=−2. At the ACS, RAM and PCAS, in case the ongoing activity involving a non-registered user (a user with version=−2), the process may be different. Firstly, both O-PCAS and T-PCAS may detect that an INVITE aimed to a de-provisioned client has been sent. This information about the B party may be sent to the ACS, who may provision the user in the same terms than before and may issue a binary SMS to make the client request a new version of the xml. The field version of the newly issued xml may be "version" !=−2. This activity may also be incorporated to the RAM database. When the client receives an xml with version !=−2, the client may register again. However, if this does not happen, the client can make the periodic xml request. In order to make the client receive the pending messages or file transfers, the xml version issued may be "version"!=−2.

Although the present invention has been described with reference to specific embodiments, it should be understood by those skilled in the art that the foregoing and various other changes, omissions and additions in the form and detail thereof may be made therein without departing from the scope of the invention as defined by the following claims.

The invention claimed is:

1. A method for managing registration of a user in an IP Multimedia Subsystem (IMS) network, the user accessing the IMS network using a client at a user device, the method comprising:
   a) receiving, at a first server in the IMS network, service traffic information of said user on the IMS network;
   b) sending the service traffic information from the first server to a managing node in the IMS network;
   c) checking, by the managing node in the IMS network, if said service traffic information of the user meets a set of predefined criteria that indicate when the user is active; and
   d) if the service traffic information of the user does not meet the set of criteria, (i) sending a request from the managing node to a configuration server in the IMS network to assign an inactive state to said user and (ii) sending a configuration message from the configuration server to the client indicating said inactive state, wherein upon receipt of the configuration message, the client is configured to prevent registration requests of the user from being sent in the IMS network during the inactive state of the user.

2. The method of claim 1, further comprising the steps of: the client receiving the configuration message and; configuring the client to prevent sending requests for registration to the IMS network while the user is assigned said inactive state.

3. The method according to claim 1, wherein the configuration message further includes relevant information to allow the access of the user to the IMS network and the information about the state of the user is included in a certain field of the configuration message.

4. The method according to claim 1, wherein the at least one service is a Rich Communication Suite (RCS) service and where the configuration server is an RCS auto configuration server, the user is a RCS user and the client is an RCS client.

5. The method according to claim 1, further comprising: when a first user sends a message to a second user that is not registered in the IMS network, said message is stored until the second user is registered in the IMS network.

6. The method according to claim 1, wherein to access the IMS network, the client sends a request for registration to the IMS network that is a SIP REGISTER message.

7. The method according to claim 1, wherein step d) further comprises:
   if the service traffic information of the user meets the set of criteria, (iii) sending a request from the managing node to the configuration server to assign a second state to the user and (iv) sending a configuration message from the configuration server to the client indicating said second state to said client.

8. The method according to claim 1, wherein step d) further comprises:
   if there is a configuration message for said user, the configuration server assigns a second state to the user and sends the configuration message indicating said second state to the client.

9. The method according to claim 1, wherein step d) further comprises:
   if the client requests an action to the configuration server, said action requiring that the user is registered in the IMS network, the configuration server assigns a second state to the user and sends a configuration message indicating said second state to the client.

10. The method according to claim 1, wherein the managing node is part of the configuration server.

11. The method according to claim 1, wherein the configuration message is an xml configuration message.

12. A network node comprising:
    an input, configured to receive service traffic information of a user in an IP Multimedia Subsystem (IMS) network for at least one service, the service traffic information being indicative of user activity at a client on a user device;
    checking logic, configured to check if the service traffic information of the user meets a set of predefined criteria that indicate when the user is active; and
    a configuration output, arranged to send a request to a configuration server in the IMS network to assign an inactive state to said user, if the service traffic information of the user does not meet the set of criteria and to send a configuration message to the client indicating said inactive state, wherein upon receipt of the configuration message, the client is configured to prevent the user from sending requests for registration to the IMS network.

13. A method for operating a client in a user equipment of a user comprising:
    a) receiving from a configuration server in an IP Multimedia Subsystem (IMS) network a configuration message including an indication of an inactive state assigned to the user, wherein the inactive state was assigned to the user as a result of a managing node in the IMS network checking if service traffic information of the user met a set of predefined criteria that indicate when the user is active; and
    b) upon receipt of the configuration message, preventing sending requests for registration to the IMS network while said assigned state is set to an inactive state.

14. A system for managing registration of a user at a user equipment in an IP Multimedia Subsystem (IMS) network, the user accessing the IMS network at a user equipment, the system comprising:
    a first server in the IMS network configured to receive service traffic information of the user from the IMS network and to send the service traffic information to a managing node in the IMS network;

the managing node in the IMS network configured to receive the service traffic information from the first server and to check if said service traffic information of the user meets a set of criteria predefined in the managing node that indicate when the user is active and, if the service traffic information of the user does not meet the set of criteria, send a request to assign an inactive state to said user to a configuration server in the IMS network;

the configuration server configured to receive the request from the managing node and to send a configuration message indicating said inactive state; and the client through which the user accesses the IMS network, the client being positioned at the user equipment of the user, the client being configured, upon receiving the configuration message from the configuration server to prevent registration requests from being sent to the IMS network while the user is assigned said inactive state.

15. The method of claim 1, further comprising:

e) determining that the user is no longer in the inactive state; and f) sending a configuration message from the configuration server to the client indicating an active state, wherein upon receipt of the configuration message the client is no longer prevented from sending requests for registration to the IMS network.

\* \* \* \* \*